(12) United States Patent
Dinh

(10) Patent No.: US 9,537,295 B2
(45) Date of Patent: Jan. 3, 2017

(54) WEATHERPROOF ELECTRICAL BOX

(71) Applicant: Thomas & Betts International, Inc., Wilmington, DE (US)

(72) Inventor: Cong Thanh Dinh, Collierville, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 311 days.

(21) Appl. No.: 13/676,263

(22) Filed: Nov. 14, 2012

(65) Prior Publication Data

US 2013/0078853 A1 Mar. 28, 2013

Related U.S. Application Data

(63) Continuation-in-part of application No. 13/072,829, filed on Mar. 28, 2011, now Pat. No. 9,077,166.

(60) Provisional application No. 61/319,304, filed on Mar. 31, 2010.

(51) Int. Cl.
| | |
|---|---|
| *H02G 3/08* | (2006.01) |
| *H02G 3/14* | (2006.01) |
| *H02G 3/12* | (2006.01) |
| *H02G 3/18* | (2006.01) |

(52) U.S. Cl.
CPC .............. *H02G 3/088* (2013.01); *H02G 3/121* (2013.01); *H02G 3/14* (2013.01); *H02G 3/185* (2013.01); *H02G 3/08* (2013.01); *H02G 3/081* (2013.01)

(58) Field of Classification Search
CPC .......... H02G 3/08; H02G 3/081; H02G 3/083; H02G 3/088; H02G 3/105; H02G 3/12; H02G 3/121; H02G 3/123; H02G 3/125; H02G 3/126; H02G 3/18; H02G 3/185; H02G 3/14; H01L 23/10; H01L 23/43; H01L 23/45; H01L 23/47; H01L 23/48; H01L 23/51
USPC ............ 174/50, 50.5, 50.51, 51, 53, 54, 55, 56, 174/57, 58, 63, 64, 66, 67; 439/535–538; 220/3.2–3.9, 4.02, 241, 242
See application file for complete search history.

(56) References Cited

U.S. PATENT DOCUMENTS

| | | | | |
|---|---|---|---|---|
| 4,381,063 | A * | 4/1983 | Leong ............................ | 220/242 |
| 4,721,476 | A * | 1/1988 | Zeliff et al. .................... | 439/142 |
| 5,722,208 | A * | 3/1998 | Humphrey et al. .......... | 52/220.8 |
| 7,011,539 | B1* | 3/2006 | Nagy et al. .................... | 439/271 |
| 7,105,745 | B2* | 9/2006 | Drane et al. ..................... | 174/67 |
| 7,358,440 | B1* | 4/2008 | Funk et al. ....................... | 174/58 |
| 8,013,242 | B1* | 9/2011 | Thibault et al. ................. | 174/53 |
| 8,536,453 | B2* | 9/2013 | Qin ................................. | 174/50 |

(Continued)

*Primary Examiner* — Ishwarbhai B Patel
*Assistant Examiner* — Paresh Paghadal
(74) *Attorney, Agent, or Firm* — Taft Stettinius & Hollister LLP

(57) ABSTRACT

An electrical box includes a housing having a mounting plate and a housing body; and a cover rotatably mounted to the housing to cover a central opening in the mounting plate when the cover is in a closed configuration and to allow access to the central opening when the cover is in an open configuration. The housing body includes at least one chamber for receiving an electrical device mounted therein and for receiving a cable for connecting to the electrical device. The housing body is coupled to the mounting plate by a plurality of rib members to form a gap between the housing body and the mounting plate. The cover includes fluid directing elements that project downwardly from the cover and which are received within the gap between the housing body and the mounting plate when the cover is in the closed configuration.

20 Claims, 16 Drawing Sheets

(56) References Cited

U.S. PATENT DOCUMENTS

| | | | |
|---|---|---|---|
| 2004/0050570 A1* | 3/2004 | Dinh et al. | 174/50 |
| 2006/0249296 A1* | 11/2006 | Drane et al. | 174/67 |
| 2008/0196921 A1* | 8/2008 | Dinh | 174/58 |
| 2008/0223599 A1* | 9/2008 | Shen et al. | 174/58 |
| 2008/0236859 A1* | 10/2008 | de la Borbolla | 174/66 |
| 2008/0264664 A1* | 10/2008 | Dinh et al. | 174/50 |
| 2009/0114689 A1* | 5/2009 | Hord et al. | 224/484 |

* cited by examiner

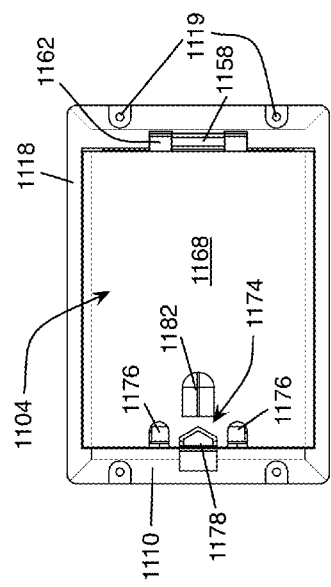
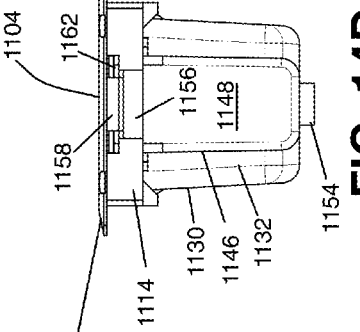
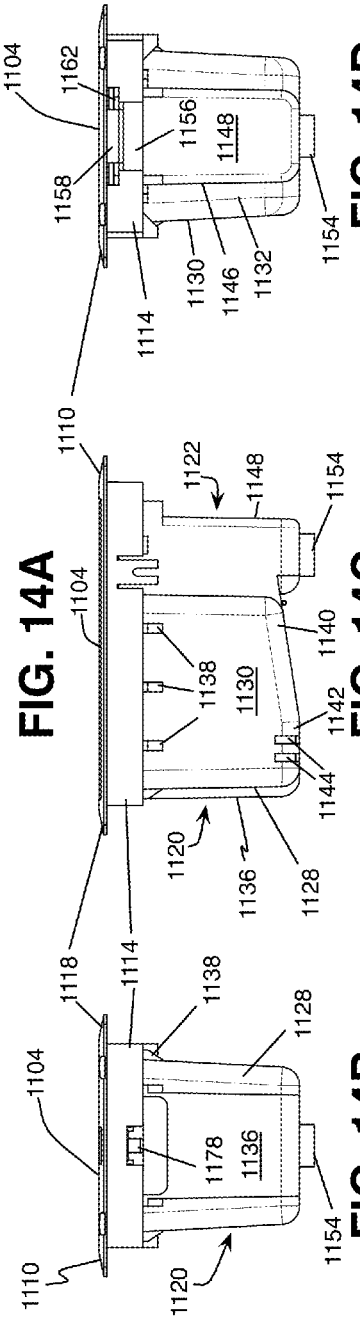
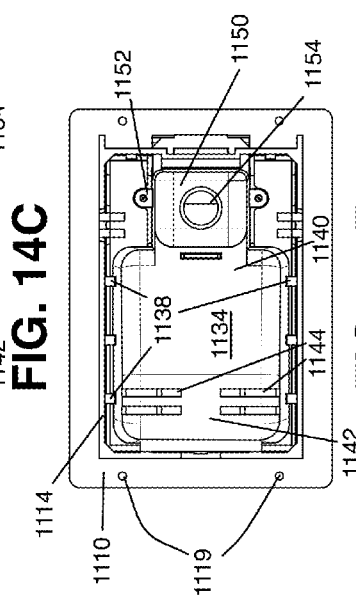

WEATHERPROOF ELECTRICAL BOX

CROSS-REFERENCE TO RELATED APPLICATIONS

This application is a continuation-in-part and claims priority to U.S. patent application Ser. No. 13/072,829 filed Mar. 28, 2011, which is a non-provisional of U.S. Provisional Patent Application No. 61/319,304 filed Mar. 31, 2010, the disclosures of which are hereby incorporated by reference herein.

BACKGROUND INFORMATION

Electrical boxes are often mounted vertically in walls prior to completion of the wall structure to provide a housing for electrical devices and wiring that may be used for telephone, video, and networking, among other utility and communication uses. For example, an electrical box may be mounted on a wall stud prior to drywall installation, thus providing an electrical housing within the wall for the termination of electrical cable and the connection of the cable wiring to a mounted electrical outlet.

In outdoor applications, electrical boxes are often mounted vertically to a wall or other structure to supply electricity in an outdoor setting. Some traditional installations may provide a box that houses an electrical outlet mounted to the vertical surface of an exterior wall. A cover may be provided over outdoor electrical outlet receptacles to help protect the outlet from rain, snow and other environmental conditions. The cover allows access to the outlet receptacles in order to plug in a male electrical fitting of an electrical cord or device into a receptacle. In some installations, the electrical box may be mounted within the exterior wall and a cover provided over the outlet receptacles.

BRIEF DESCRIPTION OF THE DRAWINGS

FIGS. 14A-14E are top, front, side, rear, and bottom plan views, respectively, of the electrical box of FIG. 11 in the closed configuration;

DETAILED DESCRIPTION OF PREFERRED EMBODIMENTS

The following detailed description refers to the accompanying drawings. The same reference numbers in different drawings may identify the same or similar elements.

As described herein, an electrical box of the present invention may be conveniently installed in a horizontal orientation, and in some implementations installed within a horizontal surface, such as a deck or other outdoor flooring. The electrical box may also be installed for indoor applications and in orientations other than horizontal.

Implementations described herein provide features directed to weatherproofing devices and any wiring or circuitry that may be mounted within an electrical box, such as electrical receptacles, communication ports, circuitry, and the like, while accommodating electrical connection from the devices to the exterior of the electrical box. As described below, exemplary configurations may prevent water from migrating into and through the electrical box to the devices and wiring mounted therein, water that may originate from the external environment or that might form within the electrical box. Implementations described herein may also provide a weatherproof electrical box that accommodates an electrical fitting, such as a male two or three-pronged plug, as well as cable or cord extending from the electrical fitting to areas external of the electrical box. This may allow for electrical connection from the device to the exterior of the electrical box, while protecting the enclosed device and the electrical connection extending from the device. Additionally, embodiments described herein are directed to processes of weatherproofing electrical devices.

Figure 1:
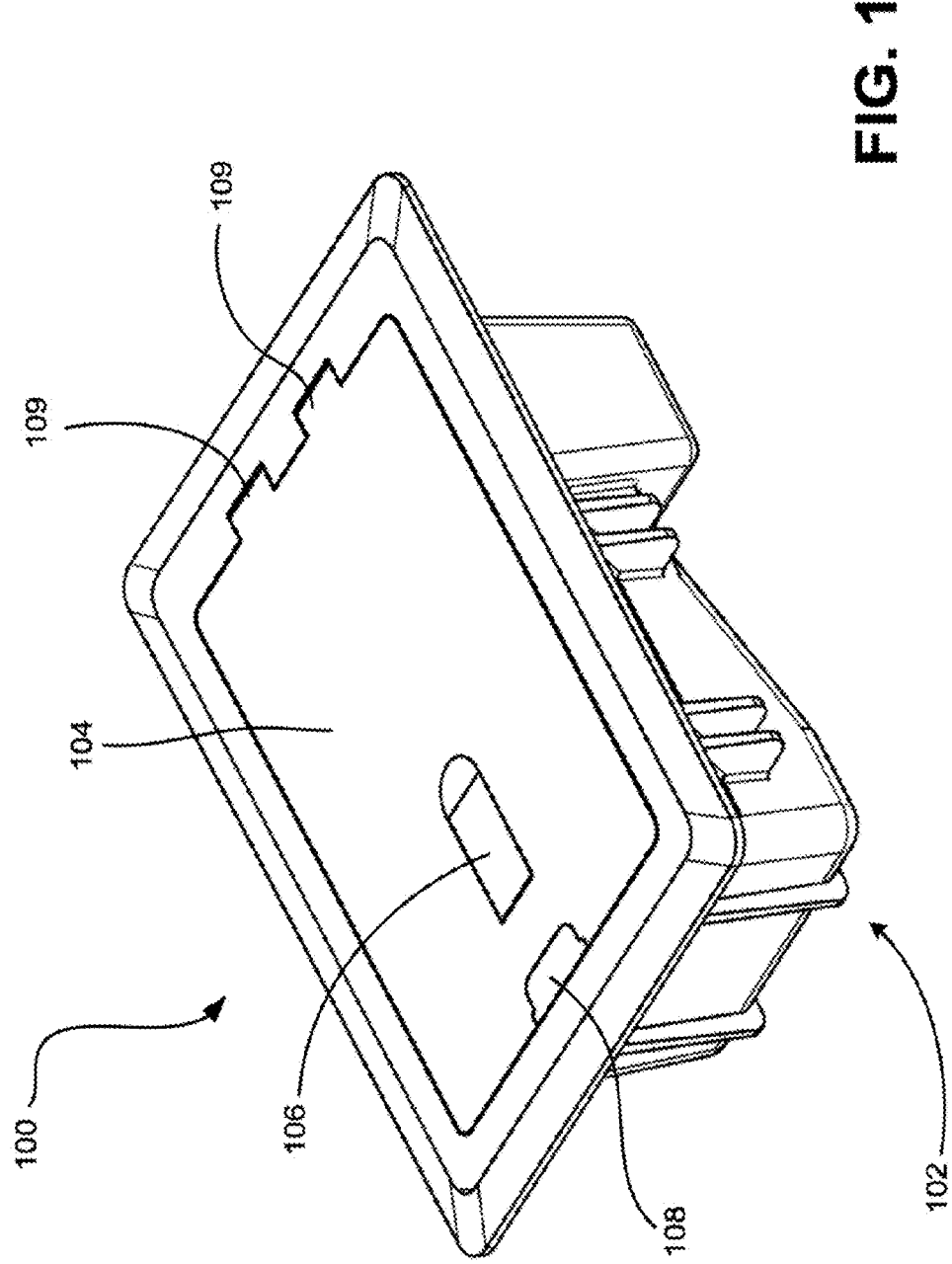
FIG. 1 illustrates an isometric view of an exemplary electrical box.
Figure 2:
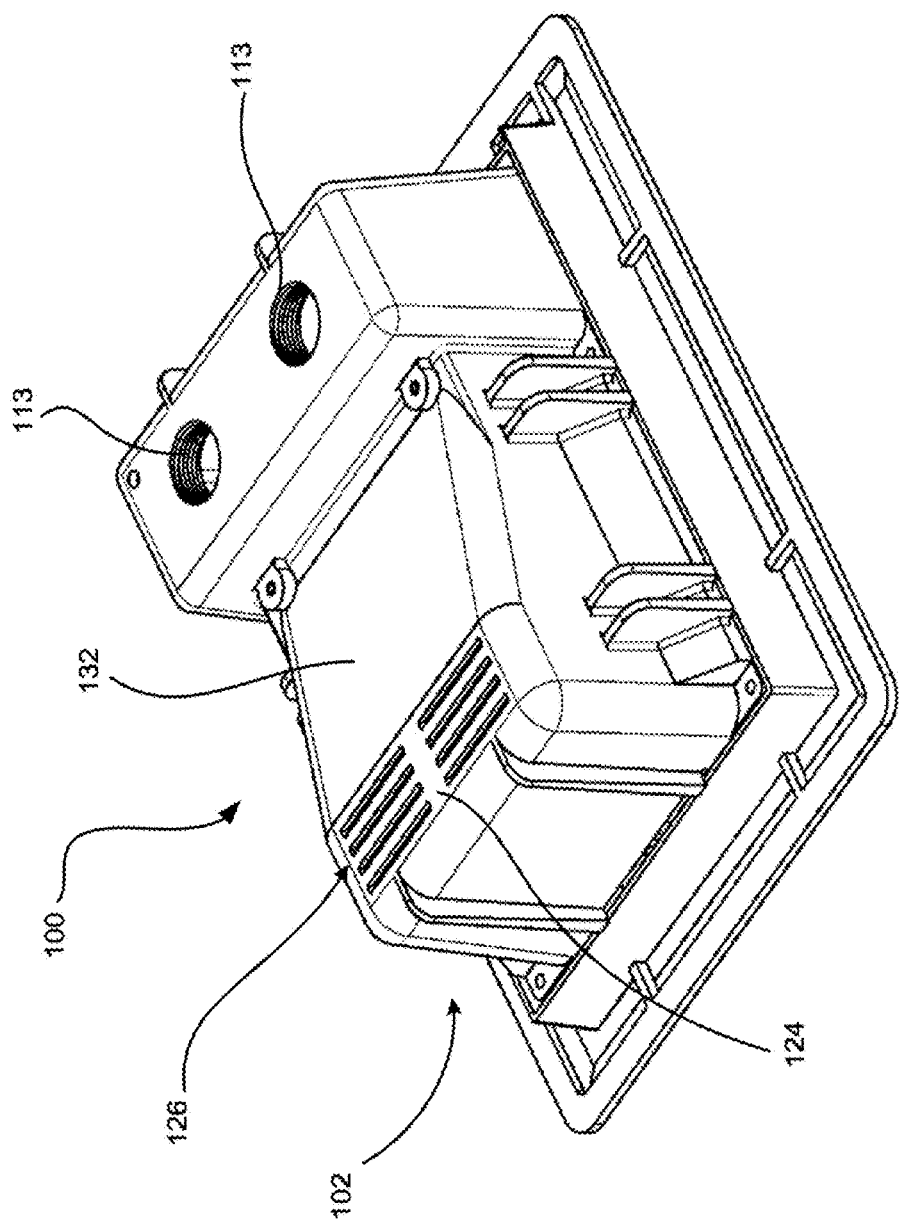
FIG. 2 is a front bottom isometric view of the electrical box of FIG. 1.
Figure 3:
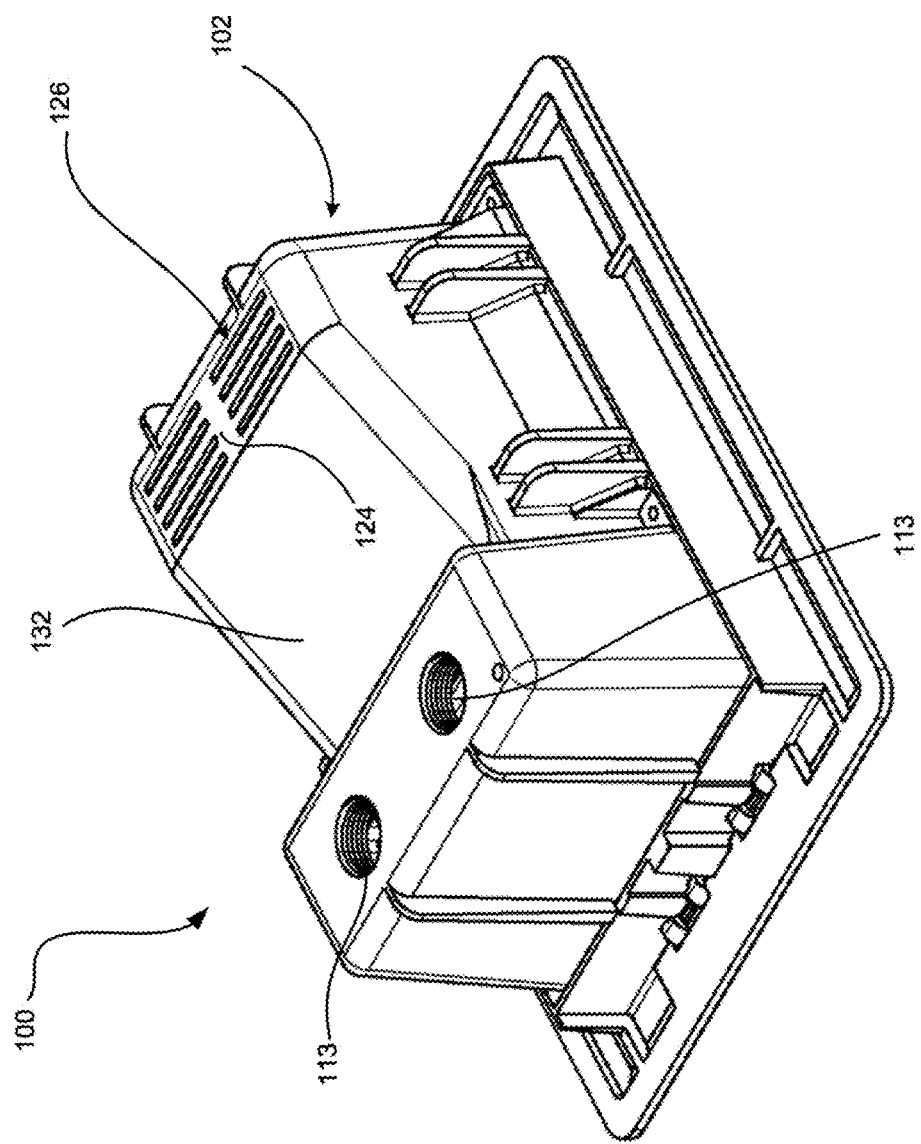
FIG. 3 is a back bottom isometric view of the electrical box of FIG. 1.

FIG. 1 illustrates an exemplary electrical box 100 having a housing 102 and a cover 104. Electrical box 100 may be associated with one or more electrical functions (e.g. a switch box, a gang box, an outlet box, etc.) and may provide an enclosure for one or more devices such as implementations described herein. The device may be an electrical device and have associated wiring, wireless connections or circuitry. The device may also have one or more applications for electrical power supply, telephone, video, or networking, among other utility and communication uses.

In one embodiment, electrical box 100 may serve as an outlet box and enclose one or more devices, such as female electrical outlets or other electrical receptacles, and any associated electrical wiring or circuitry. Depending on the implementation, electrical box 100 may include fewer, additional, or different devices or components than those illustrated in the figures (for example, a networking port, telephone jack, television cable connection, fiber optic connections, and wiring or circuitry, etc). In addition, although electrical box 100 can be associated with various electrical functions (e.g., a switch box, a gang box, etc.), for the purpose of simplicity and ease in understanding, as well as to illustrate one embodiment of the invention, electrical box 100 is described in terms of an electrical outlet box.

Housing 102 of electrical box 100 encloses the one or more mounted devices within electrical box 100 and any wiring or circuitry, providing a weatherproofing function for the device and the wiring and circuitry. In reference to FIG. 6, two enclosure volumes 110, 112 are defined by the walls and interior surfaces of housing 102 and cover 104. Walls of housing 102 between the two enclosure volumes may also serve to aid in mounting a device 114 within electrical box 100. The walls may be configured for a particular device 114 to be installed within housing 102 and an electrical fitting 116. Electrical fitting 116 illustrated in this exemplary embodiment includes a male plug of a power cord or other electrical connection element.

Device 114 may be mounted within the enclosure volume 112 of housing 102. Embodiments described herein may include additional wiring and circuitry to device 114. In the exemplary electrical box illustrated in the figures, device 114 includes a female electrical outlet comprising two receptacles, which would be connected to a common electrical cable and cable wiring to provide electrical connection with an external power source. Access elements (also referred to as "punch out holes") 113 of housing 102 may be used to run electrical cable or wiring to device 114 through housing 102 and into enclosure volume 112, allowing the cable and wiring to be connected to device 114. Access into the interior of housing 102 and enclosure volume 112 in some implementations may be afforded by punch out portions of the housing or other access elements. Access elements 113 may include punch out holes provided in housing 102 of electrical box 100 and may, based on the implementation, be formed in the bottom surface, side walls, or back wall of housing 102. Cable, such as NM (nonmetallic) or other cable and wiring may be connected to device 114 through the punch out hole(s) 113. The cable may be installed in a traditional manner relative to the punch out hole 113 so as to insulate the cable, close/seal the punch out hole 113 and maintain isolation of volume 112 from the environment external to electrical box 100. Accordingly, enclosure volume 112 may be environmentally isolated from the external environment of electrical box 100.

Housing 102 and cover 104 of electrical box 100 enclose the one or more mounted devices and any wiring or circuitry within enclosure volume 112, providing a weatherproofing function for the device and the wiring and circuitry. The isolation of volume 112 from the environment external to electrical box 100 is maintained even when cover 104 is open and enclosure volume 110 is accessible external of electrical box 100, as exemplified in FIG. 4. In reference to FIGS. 4 and 6, enclosure volume 112 is defined by the walls and interior surfaces of housing 102 and cover 104, including upper enclosure wall 115. Upper enclosure wall 115 encloses the one or more mounted devices and any wiring or circuitry within enclosure volume 112 and does not open enclosure volume 112 to the external environment or to enclosure volume 110 upon the opening of cover 104.

Referring back to FIG. 1, cover 104 may include latch 106 for use in opening cover 104 relative to housing 102. Latch 106 may secure cover 104 to housing 102 in a closed configuration of cover 104 and may allow cover 104 to be opened for access to enclosure volume 110, the receptacle of device 112, and a connected electrical fitting 116. Cover 104 assists to retain the environmental isolation of the enclosure volume 110 from environmental conditions exterior of electrical box 100, and may provide additional environmental isolation of enclosure volume 112. In the exemplary embodiment, a user may lift latch 106, releasing internal locking mechanisms of the cover 104 (not shown) in some implementations, and open cover 104 by rotating the cover about hinge elements 109.

Figure 4:
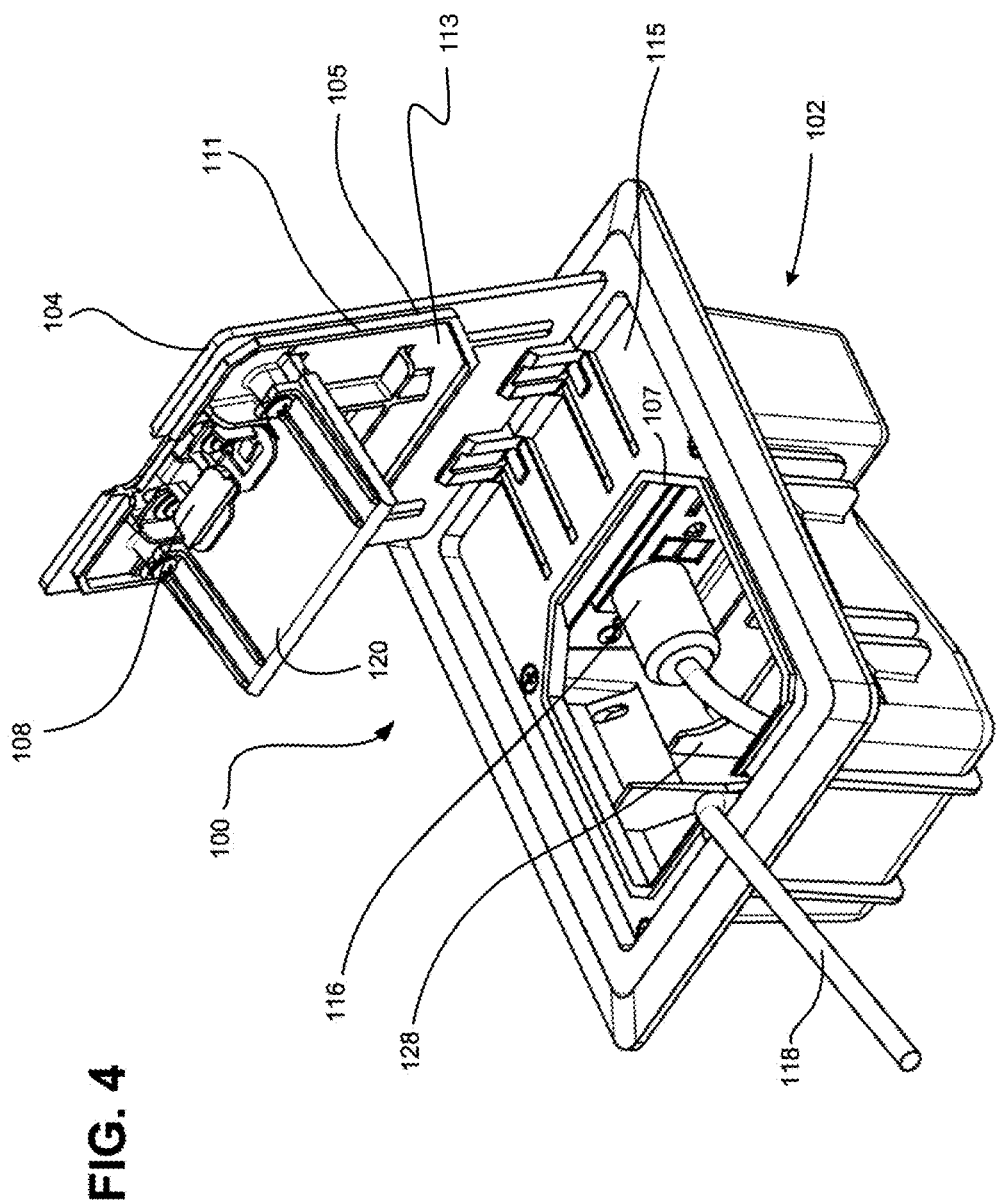
FIG. 4 illustrates an embodiment of the electrical box of FIG. 1 with the cover open.
Figure 5:
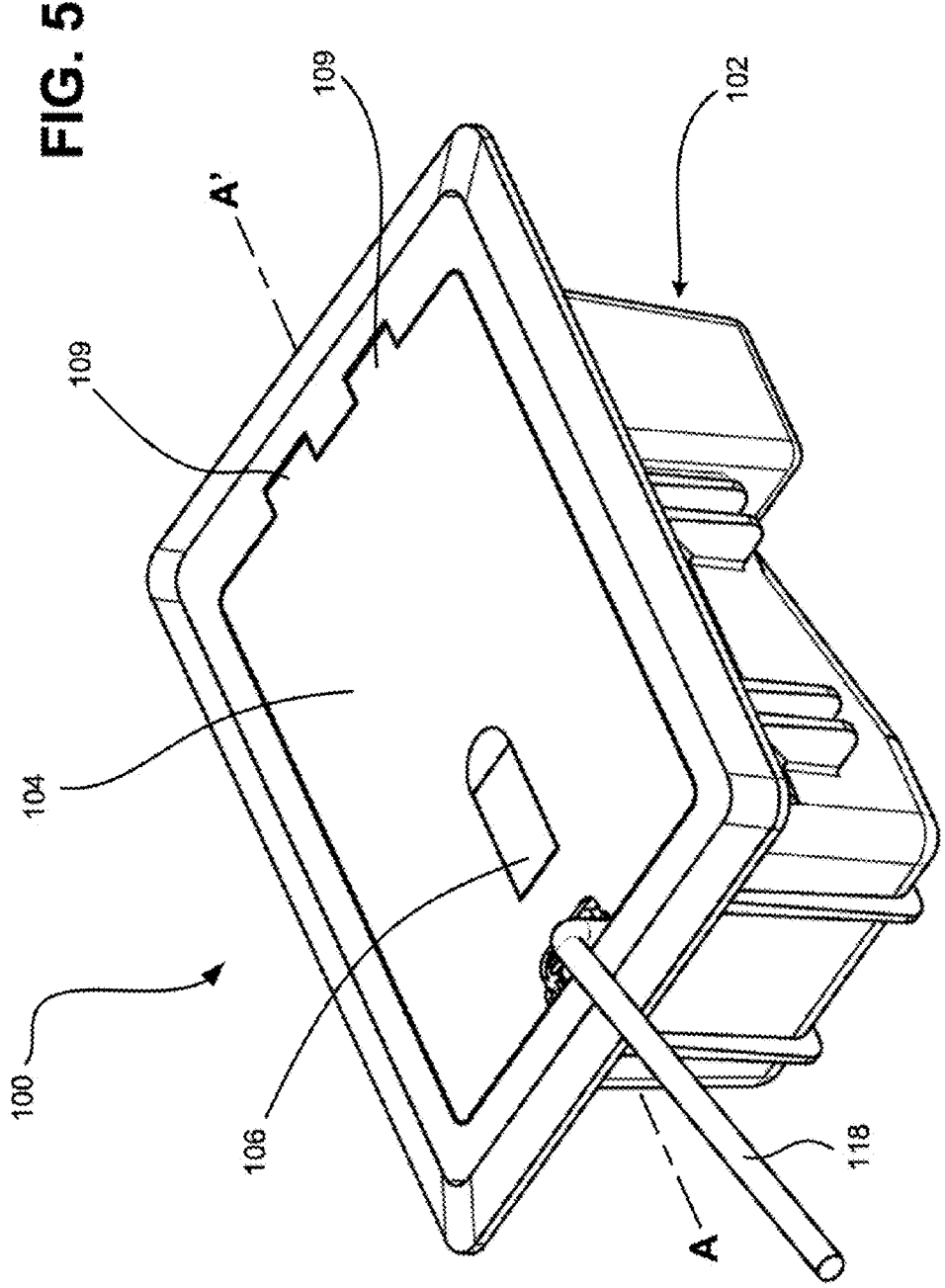
FIG. 5 illustrates an embodiment of the electrical box of FIG. 1 with the cover closed.

As shown in FIG. 1, cover 104 may include a cable door 108 to allow cable or other wiring, conduit or the like of electrical fitting 116 to be run through cover 104. Cable door 108 may be opened, as shown in FIGS. 4 and 5, so that a cable 118 connected with fitting 116 may be accommodated by electrical box 100 when cover 104 is closed. Cable door 108, when closed, as illustrated in FIG. 1, serves to further retain the environmental isolation of the enclosure volume 110 from environmental conditions exterior of electrical box 100, such as when an electrical fitting 116 is not connected to device 114. However, even when the cable door 108 is opened, insulative elements may be used in some implementations, such as material restricting the opening of cable door 108, that further assists retaining the environmental isolation of the enclosure volume 110 from environmental conditions exterior of electrical box 100. Exemplary insulative elements may include a gasket that allows cable 118 to run through the opening of cable door 108 while restricting the opening of the cable door surrounding the cable. The gaskets might be connected with cover 104 or housing 102. The gasket or other insulative element may accommodate cable 118 of electrical fitting 116 when installed to electrical box 100 and assist in retaining the environmental isolation of enclosure volume 110 when cover 104 is closed.

Furthermore, gaskets or other insulative elements may be provided to further assist retaining the environmental isolation of enclosure volume 110 from environmental conditions exterior of electrical box 100. In some embodiments, as shown in FIG. 4, a rib 111 may project from interior surface 105 of cover 104, and may correspond to interlocking elements 107 of cover 104 and housing 102, so as to retain the environmental isolation of enclosure volume 110 when cover 104 is in a closed configuration. A resilient gasket 113 or gasket material may be secured within rib 111 (e.g., via adhesive) and may be used to restrict or insulate the opening of cable door 108. Gasket 113 may be formed of a resilient material, such as rubber, and may be configured to provide a seal between cover 104 and housing 102, when compressed. Other gaskets or insulative elements may be used corresponding to cover 104 and housing 102 in order to achieve weatherproofing and prevent water migration into electrical box 100.

In outdoor applications, water may nonetheless migrate into the enclosure volume 110, or moisture and condensation can form within enclosed volume 110, depending upon environmental conditions and given that a cable may extend through cover 104. For example, electrical box 100 may be installed in decking that is exposed to rain or snow, and despite the use of cover 104 and insulative elements such as gaskets, water may migrate along cable 118 due to gravity, water surface tension and other factors that allow migration into enclosure volume 110. Water that is present within enclosed volume 110 on cable 118 could continue to migrate along cable 118 to electrical fitting 116 and device 114. Water and other moisture that reach the fitting 116 and device 114 may create conditions that could result in damage to device 114 and fitting 116, and even damage or disruption of the electrical circuit.

However, an orientation and configuration of cable 118, and one providing a downwardly extending surface of at least a portion of cable 118 within enclosure volume 110, will direct migrating water along cable 118 to the bottom surface of enclosure volume 110. Accordingly, shown in FIG. 6, cable 118 may be formed into a loop 122 and retained in that configuration by electrical box 100 to facilitate water migrating along downwardly extending surface 121 of cable 118 to respond to gravitational forces and drip to the bottom surface 124 of housing 102. Water that collects at the bottom surface 124 may then migrate out of the enclosure volume 110 by way of openings 126 in housing 102.

Figure 6:
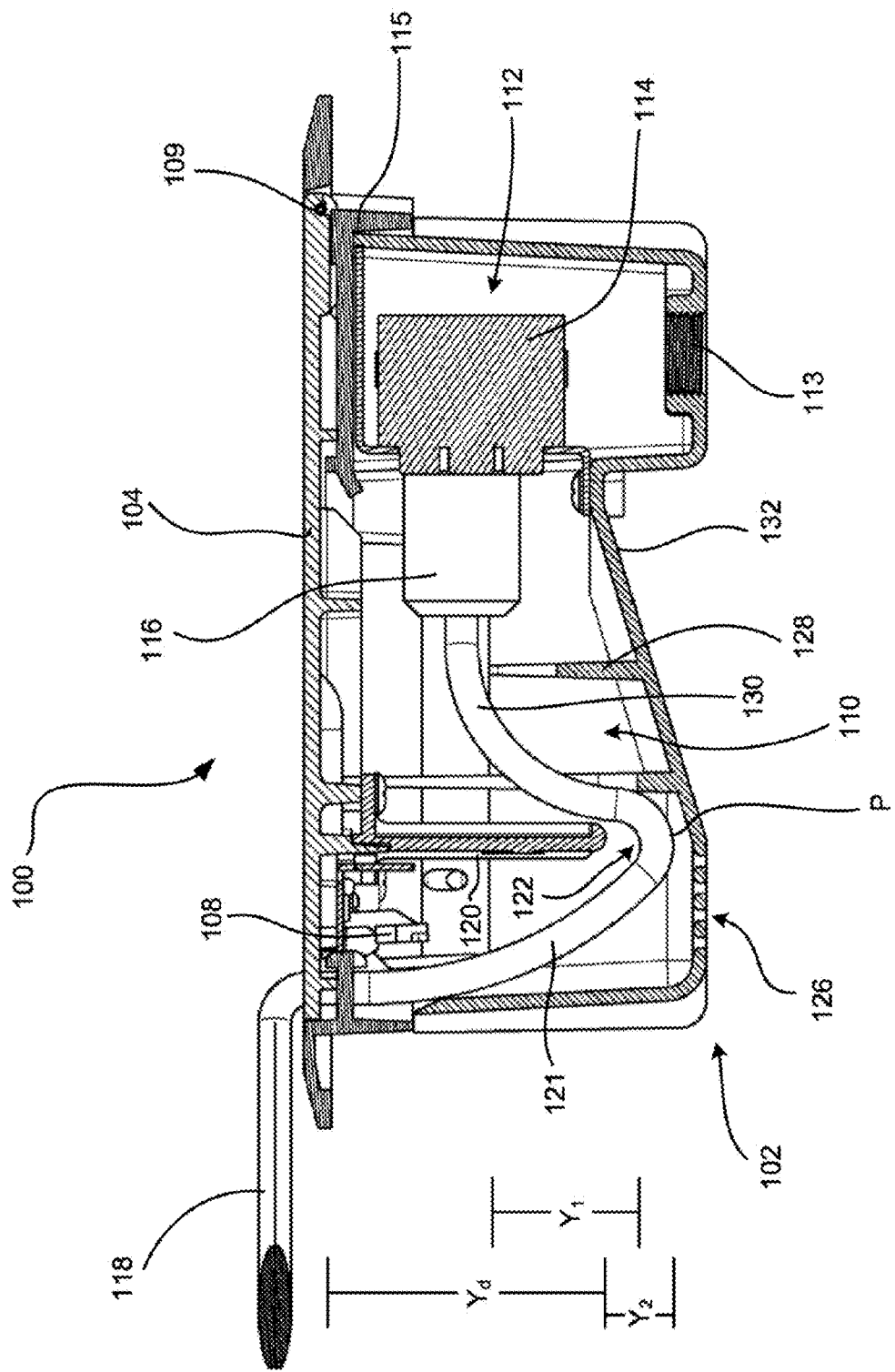
FIG. 6 is a cross sectional view of the electrical box of FIG. 5.

Consistent with implementations described herein, a cable configuration element 120 may be provided to facilitate the dripping, collection, and flow of water out of enclosure volume 110 due, at least in part, to water migration along cable 118. As shown in FIGS. 4 and 6, cable configuration element 120 may aid in creating loop 122 in cable 118 and to further retain the cable in the loop configuration when cover 104 is closed. As illustrated in FIG. 4, cable configuration element 120 may depend from, and in some implementations be integral with, cover 104 and extend into enclosure volume 110 when cover 104 is in a closed configuration. For example, cable configuration element 120 may depend from cover 104 and extend into enclosure volume 110 a distance $Y_d$ sufficient to move a portion of cable 118 downward relative to an inside surface of cover 104 to form or retain loop 122 in cable 118. Loop 122 and downwardly extending surface 121 may be retained in the preferred shape and configuration illustrated in FIG. 6 by cable configuration element 120 upon closing cover 104. Other configurations of cable 118 may also be formed if desired; however, having the surface 121 of cable 118 extended downwardly facilitates drip formation of water migrating along cable 118.

As shown, cable configuration element 120 depends from cover 104 and extends into enclosure volume 110 a distance $Y_d$ with the cover 104 retained in a closed position. The distance $Y_d$ may be considered the distance that cable configuration element 120 extends so as to form and retain the desired shape and downward extension of loop 122 and downwardly extending surface 121 of at least a portion of cable 118 within enclosure volume 110 when cover 104 is closed.

Furthermore, FIG. 6 illustrates other exemplary features of the present invention that assist in preventing water from migrating along cable 118 to electrical fitting 116 and device 114. For example, a splash guard element 128 may extend upwardly from bottom surface 124 of housing 102 and prevent or reduce the likelihood of water splashing toward electrical fitting 116 and/or device 114. In some implementations, splash guard element 128 may also support cable 118 when the cable and electrical fitting 116 are installed within enclosure volume 110 and connected with device 114. For example, splash guard element 128 extends upwardly from bottom surface 124 a distance $Y_1$. The distance $Y_2$ defines the amount of deflection of cable 118 below the bottom surface of cable configuration element 120. The length and amount of this deflection may be configured by modifying the length $Y_d$ of cable configuration element 120.

Embodiments of the present invention may provide particular dimensions for $Y_d$, $Y_1$ and $Y_2$ to achieve an acceptable downward extending surface 121 and loop 122 in cable, although other suitable configurations are also supported in a manner consistent with implementations described herein.

Cable configuration element 120, and/or splash guard element 128 in some implementations, need not retain contact with cable 118 when cover 104 is closed provided that cable 118 retains surface 121 in a downwardly extending configuration and loop 122. FIG. 6 illustrates one implementation wherein cable configuration element 120 and splash guard element 128 are not in contact with cable 118; however downwardly directed surface 121 and loop 122 of cable 118 are present and may be retained should cable 118 adjust within electrical box 100, such as if cable 118 were pulled upon or if temperature changes caused the cable to move.

It should be further noted that in the exemplary electrical box 100 illustrated in FIG. 6 an upwardly extending surface 130 is formed in cable 118 that helps prevent water migration beyond the lowest point P of cable 118, allowing gravitational forces to act upon any water migration in the direction of device 114 and electrical fitting 116 past point P. Cable configuration element 120, and as exemplified in FIG. 6, splash guard element 128 may similarly create and retain the upwardly extending surface 130 formed in cable 118 as created and retained in regard to downwardly extending surface 121 and loop 122. In some embodiments cable 118 may form a loop extending upwardly corresponding to upwardly extending surface 130.

Another exemplary feature that further assists in preventing water from migrating to electrical fitting 116 and device 114 includes inclined bottom surface 132 of housing 102. As shown in FIG. 6, inclined bottom surface 132 may incline in a direction within the enclosure volume 110 toward the device 114 and connected electrical fitting 116. Inclined bottom surface 132 prevents water migration toward device 114 and electrical fitting 116, similar in functionality to the upward directed surface 130, by directing water flow away from device 114 and electrical fitting 116 and in the direction of bottom surface 124 and openings 126. Inclined bottom surface 132 allows gravitational forces to work against water migration in the direction of device 114 and electrical fitting 116 along the inclined bottom surface 132. Accordingly, openings 126 and inclined bottom surface 132 may further aid in draining water from enclosure volume 110.

Figure 7:
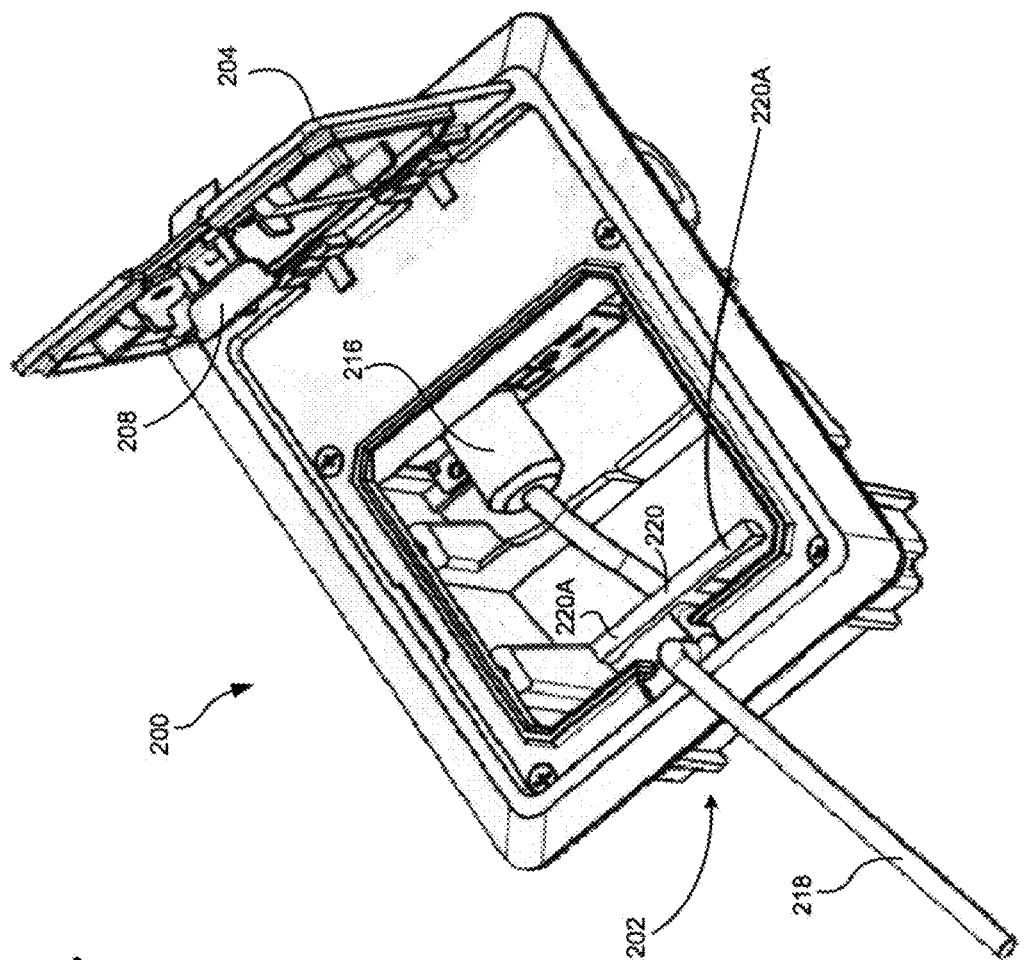
FIG. 7 is an isometric view of a second exemplary electrical box with the cover open.
Figure 8:
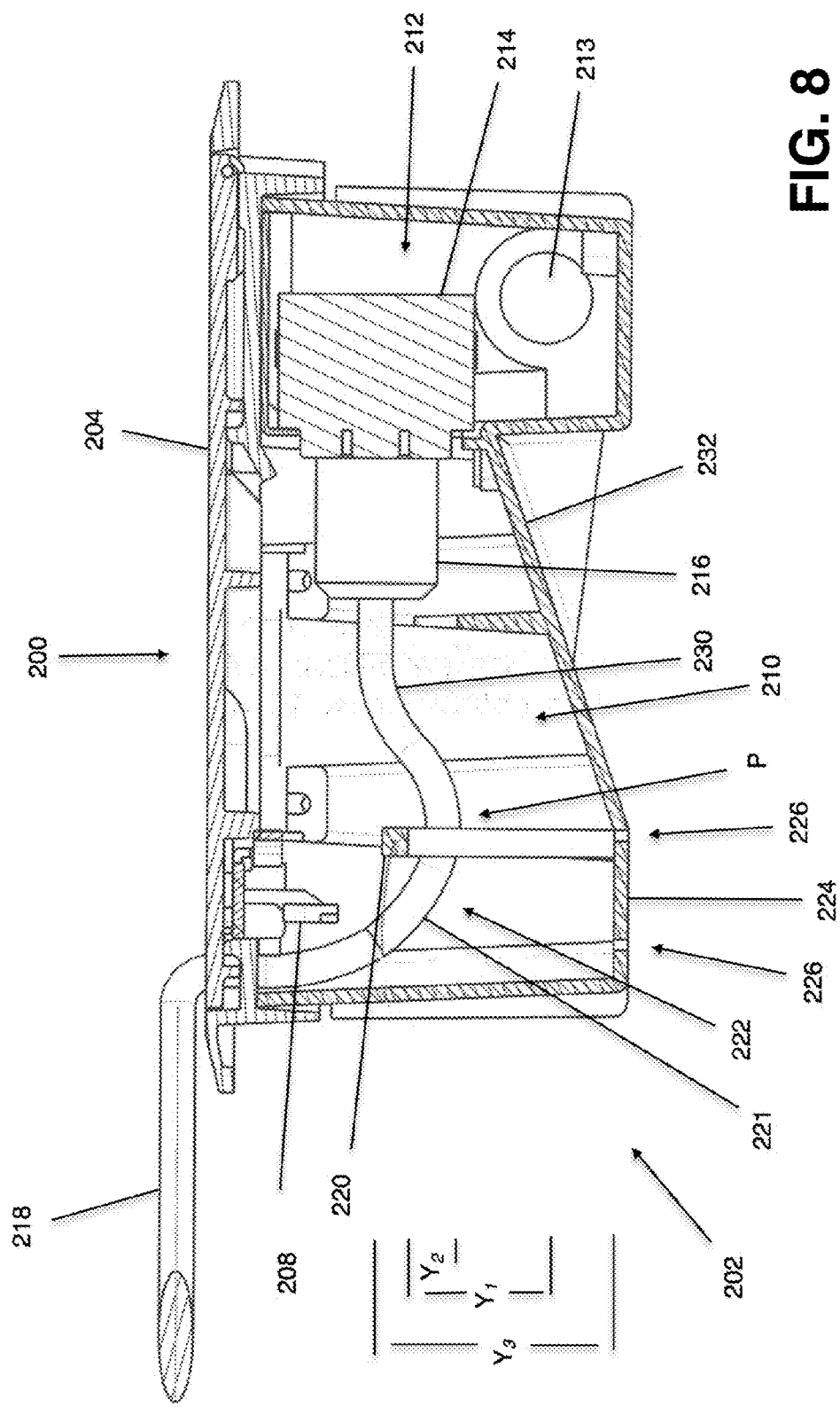
FIG. 8 is a cross sectional view of the electrical box of FIG. 7.

An alternative embodiment is illustrated in FIGS. 7 and 8 as electrical box 200 having housing 202 and another implementation of the cable configuration element of FIGS. 1 through 6. Many of the features previously described in relation to the embodiment of FIGS. 1 through 6 are also applicable to the embodiment of FIGS. 7 and 8.

As shown in FIGS. 7 and 8, a cable configuration element 220 may be provided to facilitate the dripping, collection, and flow of water out of enclosure volume 110 due, at least in part, to water migration along cable 118. Cable configuration element 220 aids in preferably creating and maintaining downwardly extending surface 221 and loop 222 in cable 218 and helps to further retain the cable in the loop configuration. For example, cable configuration element 220 may create and maintain loop 222 and downwardly extending surface 221 of cable 218, independent of cover 104. In some implementations cable configuration element 220 may have one or more retaining elements 220A that may comprise a hook or other retaining shape or function for retaining loop 222 in cable 218. As shown, in some embodiments, cable configuration element 220 may comprise a substantially T-shaped configuration, including retaining elements 220A.

As illustrated in FIG. 8, cable configuration element 220 extends from, and in some implementations is integral with, housing 202 and extends into enclosure volume 210 upwardly from bottom surface 224 of housing 202. In one implementation, cable configuration element 220 may extend upwardly from bottom surface 224 of housing 202 and into enclosure volume 210 a distance $Y_3$ sufficient to retain a portion of cable 218 to form loop 222. Loop 222 and downwardly extending surface 221 may be retained in the preferred shape and configuration illustrated in FIGS. 7 and 8 by cable configuration element 220 so that a portion of cable 218 extends below a retaining element 220A of cable configuration element 220. A portion of the cable length of cable 218 may be made to extend below retaining element 220A either prior to connecting electrical fitting 216 with device 214 or after connection by adjusting a portion of cable 218 to extend below a retaining element. Other configurations of cable 118 may also be formed if desired; however, having the surface 221 of cable 218 extended downwardly facilitates drip formation of water migrating along cable 218.

Exemplary distance $Y_3$ may be considered the distance that cable configuration element 220 extends so as to form and retain the desired shape and downward extension of loop 222 and downwardly extending surface 221. The distance $Y_3$ in this implementation is not defined by a closed configuration of cover 204.

As shown in FIGS. 7 and 8, a splash guard element 228 may extend upwardly from bottom surface 224 of housing 202 and may prevent or limit splashing of water toward fitting 216 and/or device 214. In some implementations, splash guard element 228 may support cable 218 when cable 218 and electrical fitting 216 are installed within enclosure volume 210 and connected with device 214. For example, splash guard element 228 in FIGS. 7 and 8 extends upwardly from bottom surface 224 a distance $Y_1$ such that the downwardly extending surface 221 of at least a portion of cable 218 will depend below the top of the splash guard element 228 a distance $Y_2$. The distance $Y_2$ that downwardly extending surface 221 of at least a portion of cable 218 will depend can be controlled by the distance $Y_3$ that cable configuration element 220 extends upwardly from bottom surface 224 and into enclosure volume 210. Embodiments of the present invention may provide particular dimensions for $Y_3$, $Y_1$ and $Y_2$ to achieve an acceptable downwardly extending surface 221 and loop 222 in cable.

Cable configuration element 220 and/or retaining elements 220A need not retain contact with cable 218 provided that cable 218 retain downwardly extending surface 221 and loop 222. FIG. 8 illustrates one implementation wherein the cable configuration element 220 and splash guard element 228 are not in contact with the cable; however downwardly directed surface 221 and loop 222 of cable 118 are present and may be retained should the cable 218 adjust within electrical box 200, such as if cable 218 were pulled upon or if temperature changes caused the cable to move.

It should be further noted that in exemplary electrical box 200 illustrated in FIG. 8, an upwardly extending surface 230 may be formed in cable 218, similar to upwardly extending surface 130 of FIG. 6, that helps to prevent water migration beyond the lowest point P of cable 218. This implementation again allows gravitational forces to act upon any water migration in the direction of device 214 and electrical fitting 216 past point P. Cable configuration element 220, and as exemplified in FIG. 8, splash guard element 228 may similarly create and retain the upward extending surface 230 formed in cable 218 as created and retained in regard to downwardly extending surface 221 and loop 222. In some embodiments the cable 218 may form a loop extending upwardly corresponding to upwardly extending surface 230.

Figure 9:
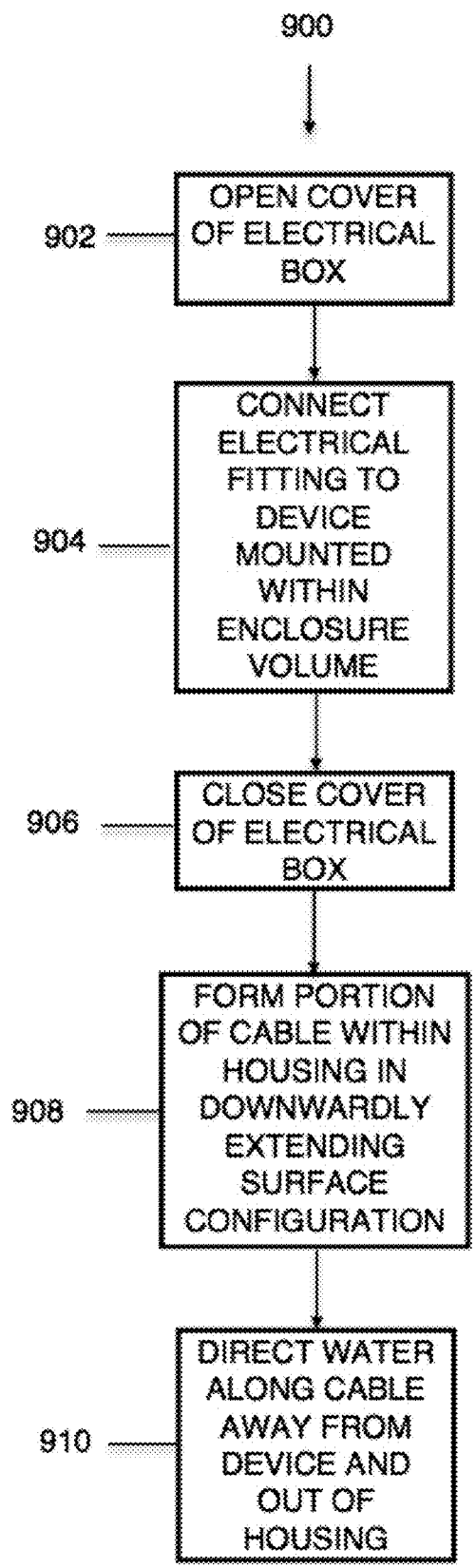
FIG. 9 is a flow diagram of a process of weatherproofing electrical devices.

FIG. 9 is a flow diagram of an exemplary process 900 of weatherproofing an electrical device. Reference is also made to FIGS. 1 through 6 in describing this implementation of weatherproofing of an electrical device. Accordingly, process 900 begins when cover 104 of electrical box 100 is opened (block 902). Electrical fitting 116 may be connected to device 114 mounted within the enclosure volume 112 of housing 102 (block 904). Cover 104 may be closed (block 906), and a portion of cable 118 within housing 102 may be formed in a downwardly extending surface configuration by cable configuration element 120 (block 908). As described above, cable configuration element 120 may project downwardly from cover 104 and may force at least a portion of cable 118 to form loop 122. More specifically, closing of cover 104 may cause a portion of cable 118 to be deflected by at least a distance $Y_d$ into volume 110. Water traveling along cable 118 may be directed away from device 114 and out of housing 112 of electrical box 100 (block 910).

Process 900 may include additional features consistent with implementations described above. For example, a downwardly extending surface configuration of a portion of cable 118 may be provided. The downwardly extending surface configuration may be provided by the closing of cover 104 and the corresponding extension downward of cable configuration element 120 into volume 110 a distance $Y_d$, thereby adjusting a portion of cable 118 below the cable configuration element 120 to create downwardly extending surface 121 and loop 122 of cable 118. In still further implementations, a user may manually form downwardly extending surface 121 and loop 122 of cable 118 prior to closing cover 104.

Figure 10:
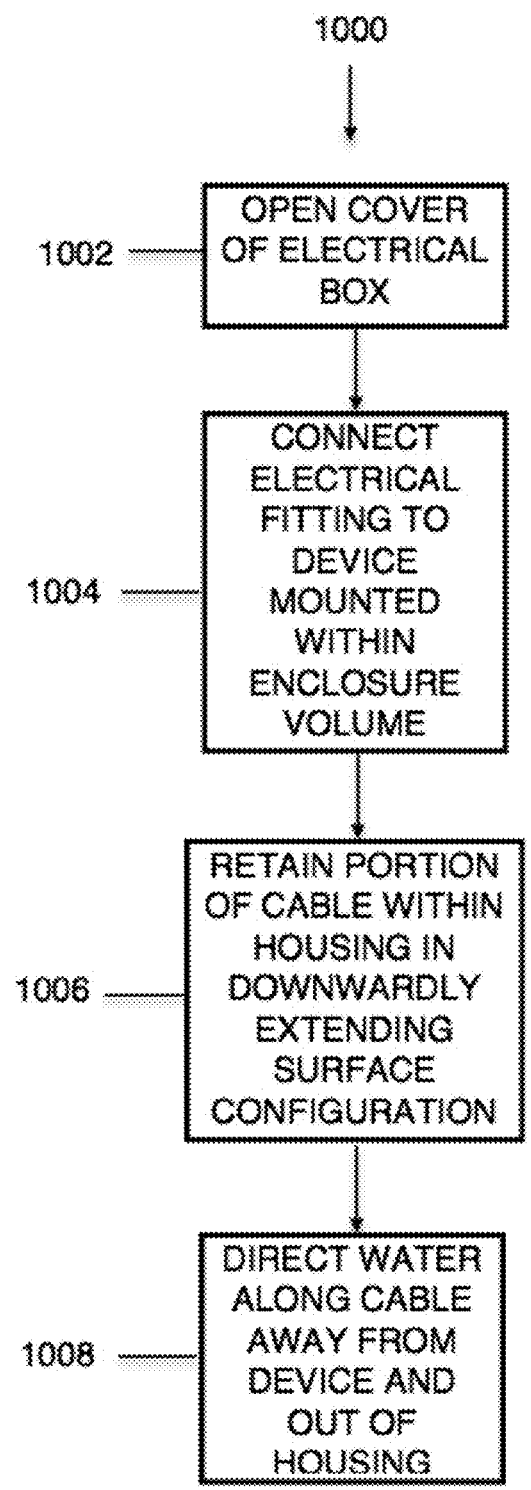
FIG. 10 is a flow diagram of a second process of weatherproofing electrical devices.

FIG. 10 is a flow diagram of an exemplary process 1000 of weatherproofing an electrical device. Reference is also made to FIGS. 7 and 8 in describing this implementation of weatherproofing of an electrical device. Accordingly, process 1000 begins when cover 204 of electrical box 200 is opened (block 1001). Next, an electrical fitting 216 may be connected to device 214 mounted within the enclosure volume 212 of housing 202 (block 1004). A portion of cable 218 may be retained within housing 202 in a downwardly extending surface configuration (block 1006). As shown in FIG. 8, the downwardly extending surface configuration may include the retention of downwardly extending surface 221 and maintenance of a loop 222 of cable 218 by cable configuration element 220, and in some implementations by retaining element 220A.

Block 1006 of process 1000 may be facilitated by a portion of the cable length of cable 218 being made to extend below retaining element 220A either prior to connecting electrical fitting 216 with device 214 or after connection by adjusting a portion of cable 218 to extend below a retaining element 220A and the extension upward of cable configuration element 220 into volume 210. Therefore the distance $Y_3$ is maintained so that the position of the portion of cable 218 retained by the cable configuration element 220 is maintained. Water traveling along cable 218 may be directed along cable 218 away from device 214 and out of housing 212 of the electrical box 200 (block 1008).

Process 1000 may include additional features consistent with implementations described above. For example, a downwardly extending surface configuration of a portion of cable 218 may be created prior to retaining cable 218 within housing 202. This step may be facilitated by a portion of the cable length of cable 218 being made to extend below retaining element 220A either prior to connecting electrical fitting 216 with device 214 or after connection by adjusting a portion of cable 218 to extend below retaining element 220A and the extension upward of cable configuration element 220 into volume 210. Therefore the distance $Y_3$ may be maintained so that adjusting the portion of cable 218 below the cable configuration element 220 creates downwardly extending surface 221 and loop 222 of cable 218. In still further implementations, a user may manually form downwardly extending surface 221 and loop 222 of cable 218 as part of the step of retaining a portion of cable 218 within housing 202 in a downwardly extending surface configuration.

Figure 11:
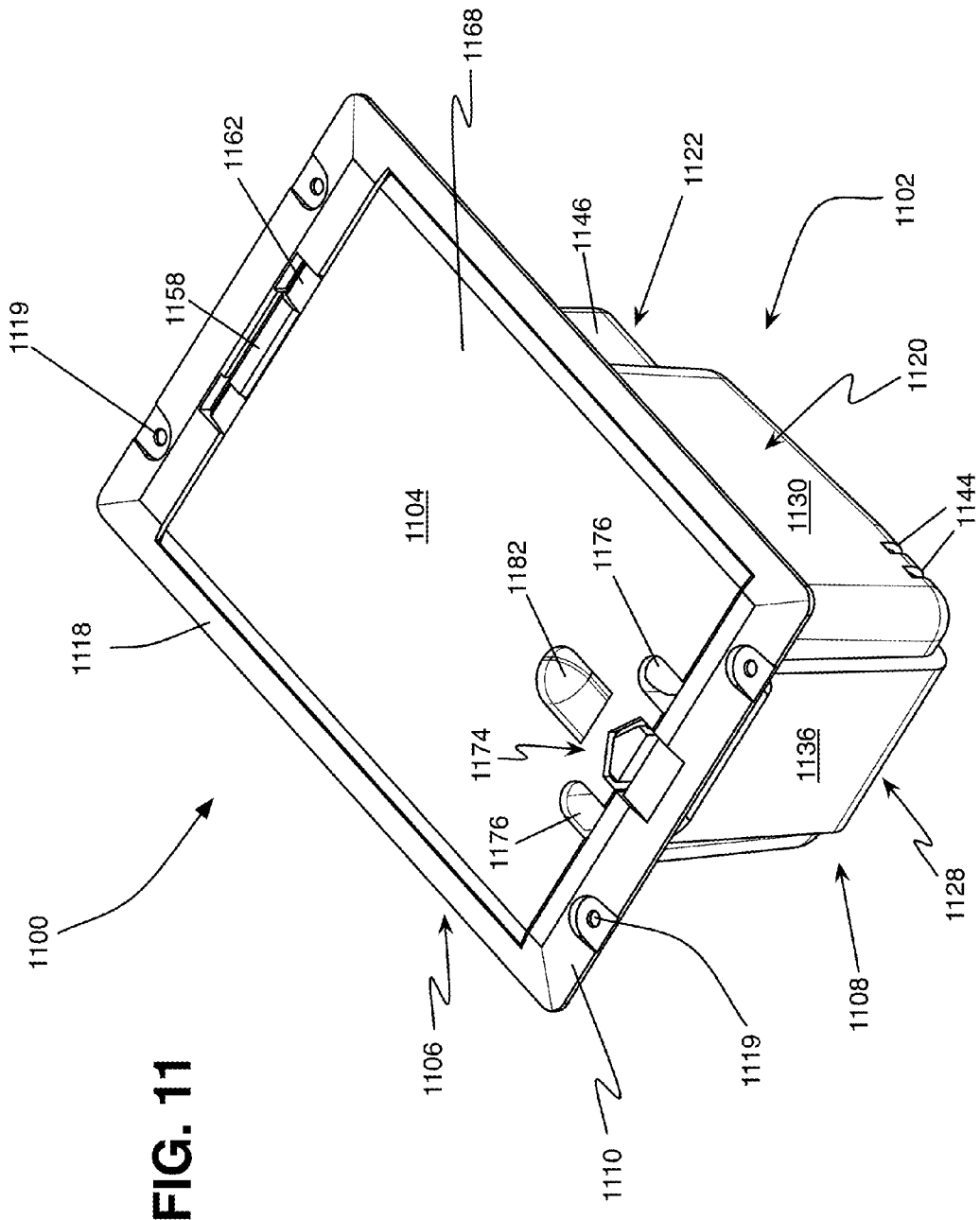
FIG. 11 is a top front isometric view of an exemplary electrical box in a closed configuration, according to another implementation.
Figure 12:
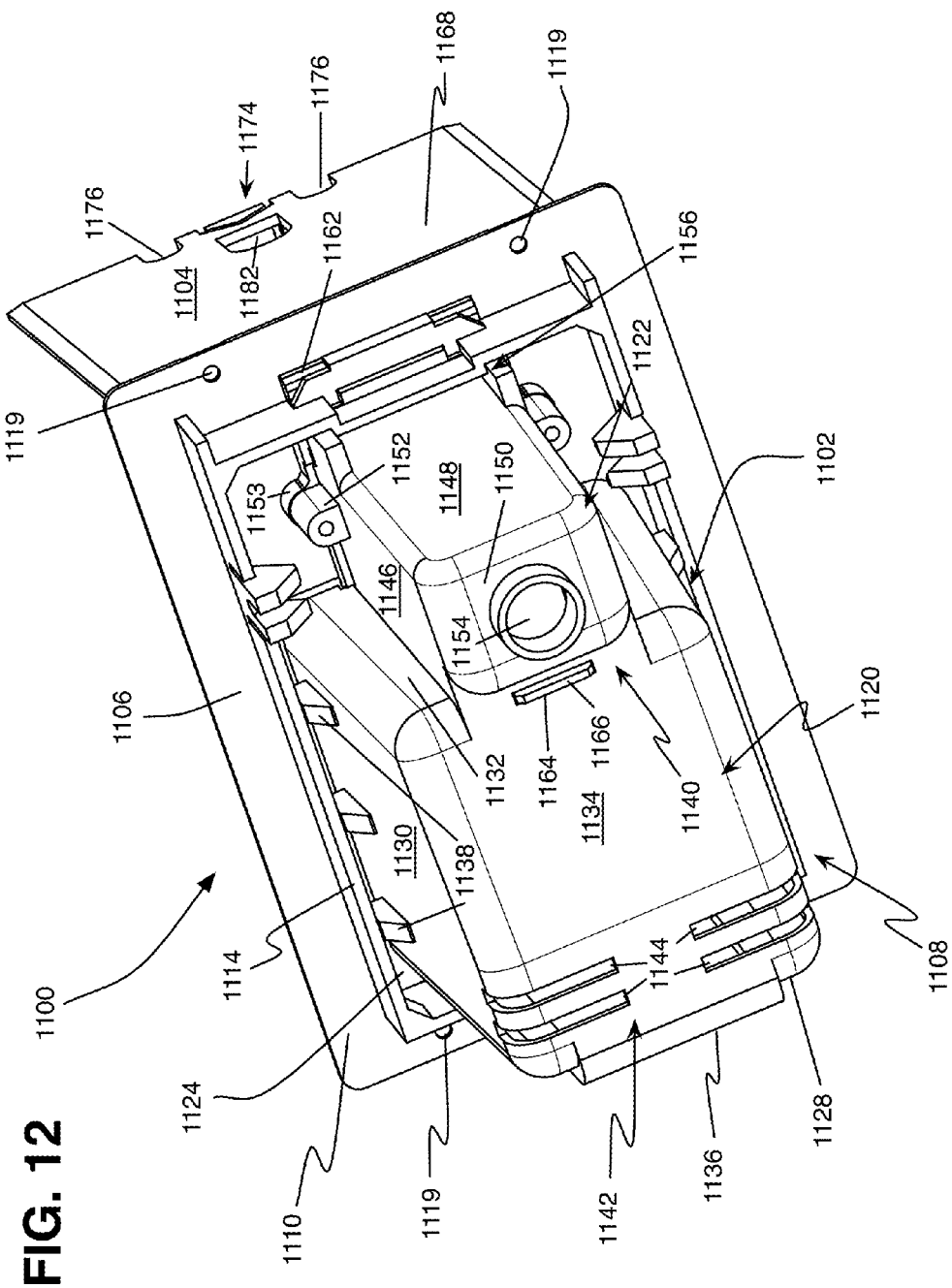
FIG. 12 is a bottom rear isometric view of the electrical box of FIG. 11 in an open configuration.
Figure 13:
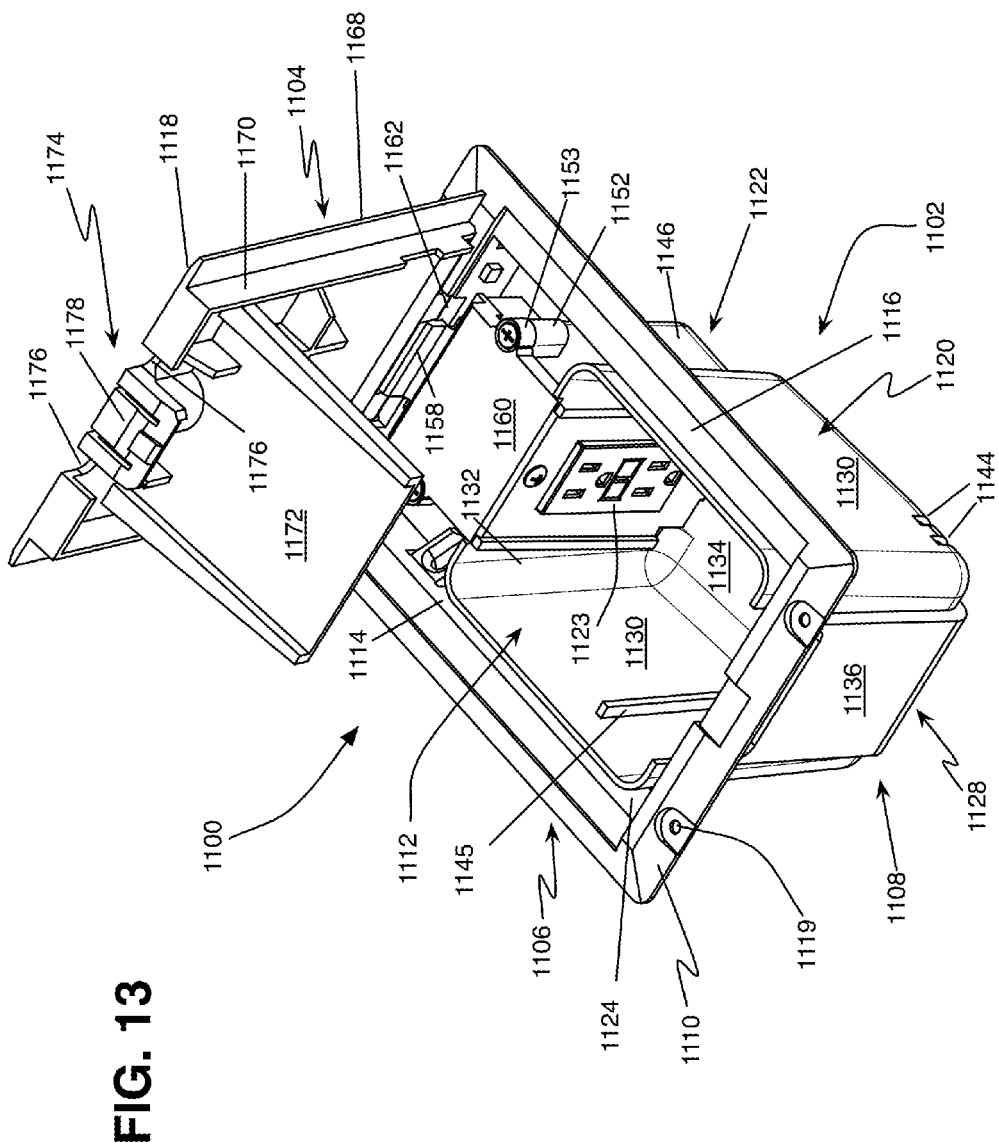
FIG. 13 is a top front isometric view of the electrical box of FIG. 11 in the open configuration.
Figure 15:
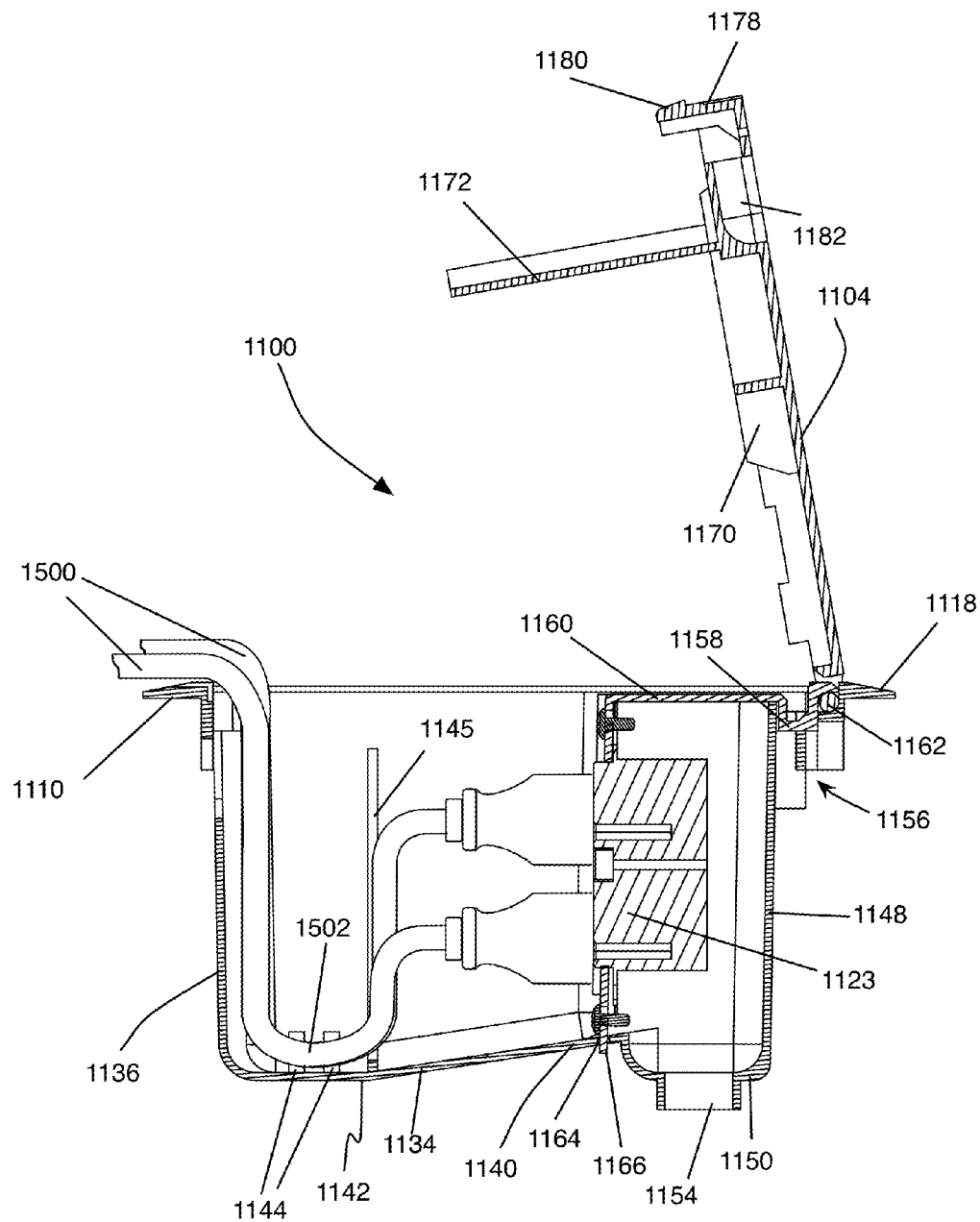
FIG. 15 is a side cross-section view of the electrical box of FIG. 11 in the open configuration.
Figure 16:
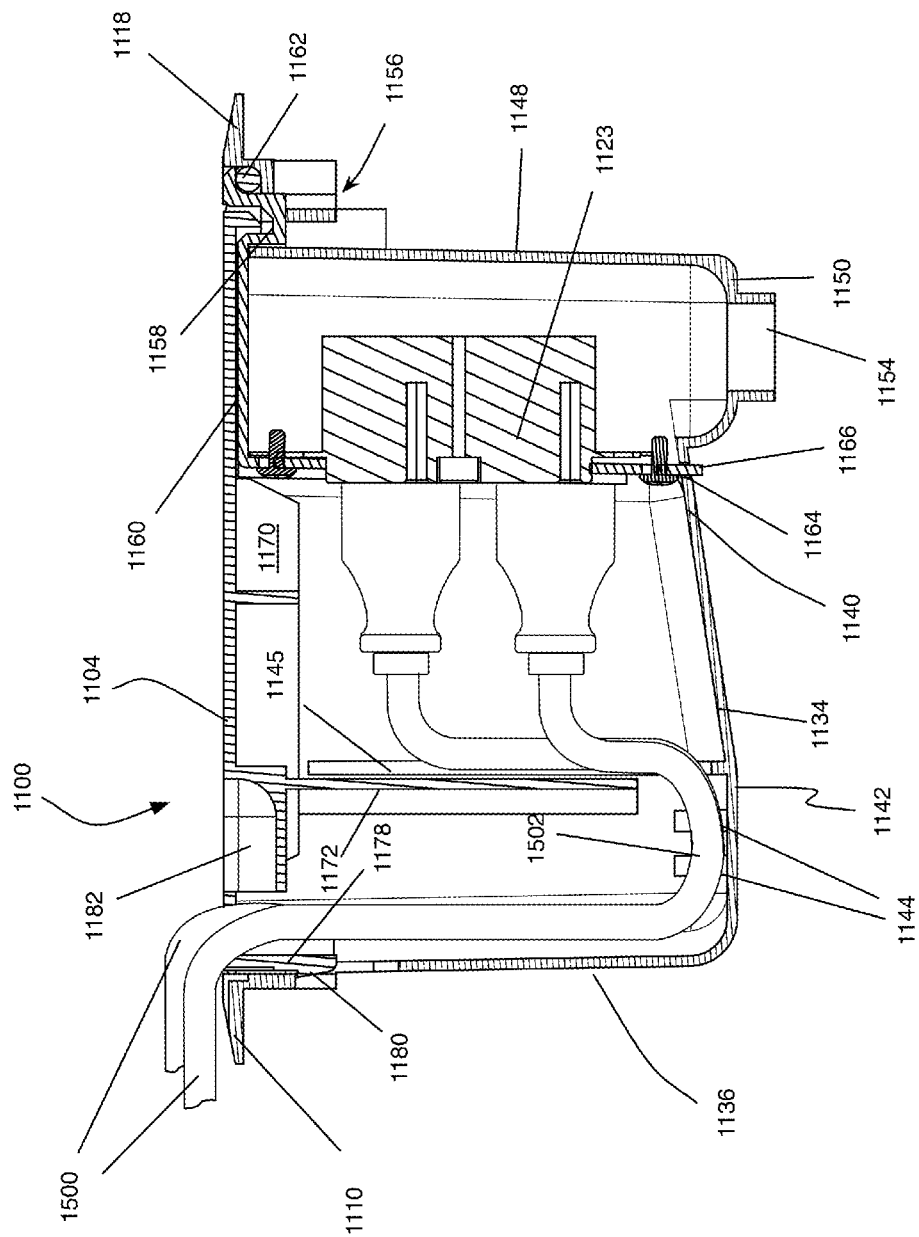
FIG. 16 is a side cross-section view of the electrical box of FIG. 11 in the closed configuration.

FIG. 11 is a top, front isometric view of an exemplary electrical box 1100 in a closed configuration, according to another implementation. FIG. 12 is a bottom, rear isometric view of electrical box 1100 in an open configuration. FIG. 13 is a top, front isometric view of electrical box 1100 in the open configuration. FIGS. 14A-14E are top, front, side, rear, and bottom plan views, respectively, of electrical box 1100 in the closed configuration. FIG. 15 is a side, cross-section view of electrical box 1100 in the open configuration. FIG. 16 is a side cross-section view of electrical box 1100 in the closed configuration.

As shown in FIGS. 11-16, electrical box 1100, includes a housing 1102 and a cover 1104. Electrical box 1100 may be associated with one or more electrical functions (e.g. a switch box, an outlet box, etc.) and may provide an enclosure for one or more devices, as described herein. The device may be an electrical device and have associated wiring, wireless connections or circuitry. The device may also have one or more applications or connections for electrical power supply, telephone, video, or networking, among other utility and communication uses.

In one embodiment, electrical box 1100 may serve as an outlet box and enclose one or more devices, such as female electrical outlets or other electrical receptacles, and any associated electrical wiring or circuitry, e.g., as shown in FIGS. 13, 15 and 16. Depending on the implementation, electrical box 1100 may include fewer, additional, or different devices or components than those illustrated in the figures (for example, a networking port, telephone jack, cable television (CATV) connection, fiber optic connections, and wiring or circuitry, etc.). In addition, although electrical box 1100 can be associated with various electrical functions (e.g., a switch box, a gang box, etc.), for the purpose of simplicity and ease in understanding, as well as to illustrate one embodiment of the invention, electrical box 1100 is described in terms of an electrical outlet box.

Generally speaking, housing 1102 of electrical box 1100 functions to enclose the one or more mounted devices within electrical box 1100 and any wiring or circuitry, thereby providing a weatherproofing function for the device and the wiring and circuitry.

Regarding housing 1102, as shown in FIGS. 12 and 13, housing 1102 includes a mounting plate 1106 and a housing body 1108. More specifically, mounting plate 1106 includes a generally planar flange portion 1110 that defines a central opening 1112 and a stiffening rim 1114 that projects downwardly from flange portion 1110 around a periphery of central opening 1112. In some embodiments, mounting plate 1106 may be flush mounted with respect to a finished surface of a wall, floor, etc., when installed.

As shown in FIG. 13, consistent with embodiments described herein, an upper surface of flange portion 1110 proximate central opening 1112 may include one or more recessed portions 1116 for receiving corresponding portions of cover 1104, as described in additional detail below. Furthermore, upper surface of flange portion 1110 may also include a sloped or angled portion 1118, for directing fluid (e.g., rain), which may impinge on electrical box 1100 away from cover 1104. As shown in FIG. 11, flange portion 1110 may also include one or more mounting holes 1119 for enabling electrical box 1100 to be secured to a mounting surface, e.g., a deck, floor, etc., via screws, nails, clips, etc.

Consistent with embodiments described herein, housing body 1108 may be suspended or located within central opening 1112 of mounting plate 1106. More specifically, as shown in FIGS. 12 and 13, housing body 1108 may include a cable receiving chamber 1120 and a device mounting chamber 1122. Housing body 1108 may be formed within central opening 1112 such that cable receiving chamber 1120 is spaced from stiffening rim 1114 by a gap 1124. As described more fully below, gap 1124 allows fluid that finds its way under cover 1104 when electrical box 1100 is in the closed configuration (see, e.g., FIG. 11) to flow out of electrical box 1100 via gap 1124, and not into cable receiving chamber 1120 or device mounting chamber 1122.

As shown in FIGS. 12, 13, and 14E, in one embodiment, device mounting chamber 1122 may project from a rear end of cable receiving chamber 1120 and may be configured to receive an electrical device 1123 (e.g. a receptacle, outlet, jack, etc.) therein. Details regarding device mounting chamber 1122 are set forth below.

Cable receiving chamber 1120 may include a front wall 1128, side walls 1130, a rear wall 1132, and bottom 1134. As shown in FIGS. 13 and 14C, front wall 1128 of cable receiving chamber 120 may be coupled to a corresponding front portion of stiffening rim 1114 by a protruding section 1136. In one implementation, as shown in FIG. 15, protruding section 1136 may be positioned within gap 1124 and may have an upper end (not shown) that is positioned lower than either an upper edge of cable receiving chamber 1120 and recessed portions 1116. This configuration ensures that fluid that impinges on the upper end of protruding section 1136 does not flow into cable receiving chamber 1120, but rather out of electrical box 1100. In addition, protruding section 1136 of front wall 1128 may include a latch receiving recess for allowing a latch on cover 1104 to be receiving within housing 1102. Details regarding the cover latch are described in detail below.

Similarly to front wall 1128, sidewalls 1130 of cable receiving chamber 1120 may be coupled to stiffening rim 1114 by a number of rib members 1138, six of which are shown in FIG. 14E. In one implementation, rib members 1138 may be positioned within gap 1124 and may have an upper end (not shown) that is positioned lower than either an upper edge of cable receiving chamber 1120 and recessed portions 1116. This configuration ensures that fluid that impinges on the upper ends of rib members 1138 does not flow into cable receiving chamber 1120, but rather out of electrical box 1100.

As shown in FIGS. 12 and 14A, bottom 1134 of cable receiving chamber 1120 includes an angled or inclined configuration in which a rearward portion 1140 of bottom 1134 (e.g., proximate to device mounting chamber 1122) is raised or elevated relative to a forward portion 1142 of bottom 1134 (e.g., distal from device mounting chamber 1122) when electrical box 1100 is installed. This configuration prevents water migration toward device mounting chamber 1122 and electrical device 1123 mounted therein by directing water flow away from device 1123 and in the direction of forward portion 1142 of bottom 1134. As shown in FIG. 12, forward portion 1142 may include a number of openings 1144 therein for allowing water or fluid to flow away from electrical box 1100. Although four general slot-like openings 1144 are shown in FIG. 12, any number of configuration of openings may be provided, such as circular holes, etc.

As shown in FIG. 13, cable receiving chamber 1120 may include a splash guard element 1145 that projects inwardly from side walls 1130 and bottom 1134 in a position proximate to forward portion 1142. Splash guard element 1145 may extend upwardly from bottom 1134 of cable receiving chamber 1120 to prevent or reduce the likelihood of water splashing toward electrical device 1123. In some implementations, splash guard element 1145 may be configured to support an electrical cable 1500 when a cable 1500 is connected to electrical device 1123.

As shown in FIGS. 12 and 13, front wall 1128, side walls 1130, rear wall 1132, and bottom 1134 may include rounded corners, thereby further increasing the ease with which fluid is directed toward forward portion 1142 and openings 1144 in bottom 1134.

As briefly described above, device mounting chamber 1122 may be coupled to rear wall 1132 of cable receiving chamber 1120. For example, as shown in FIG. 13, rear wall 1132 may include an opening therein which leads to device mounting chamber 1122. In some implementations, device mounting chamber 1122 may be configured to receive electrical device 1123 in a vertical orientation. In such a configuration, as shown in FIGS. 11-16, device mounting chamber 1122 may have a narrower width than cable receiving chamber 1120. However, in other configurations, device mounting chamber 1122 may be configured to receive electrical device 1123 in a horizontal orientation. In such a configuration, similar to that shown above in relation to FIGS. 1-8, device mounting chamber 1122 may have a width substantially similar to a width of cable receiving chamber 1120.

Device mounting chamber 1122 may include side walls 1146, rear wall 1148, and bottom 1150. As briefly described above, the dimensions of side walls 1146, rear wall 1148, and bottom 1150 of device mounting chamber 1122 may be based on a type of electrical device to be received therein. As shown in FIG. 12, side walls 1146 may include mounting flanges 1152 projecting therefrom. Mounting flanges 1152 may include holes therein configured to align with holes on mounting flanges 1153 associated with electrical device 1123. During installation, screws or the like may be used to secure electrical device 1123 to device mounting chamber 1122. Bottom 1150 of device mounting chamber 1122 may include an access element 1154 formed therethrough for receiving an electrical cable or wiring. This configuration allows the cable and wiring to be connected to electrical device 1123. Access into the interior of device mounting chamber 1122 in some implementations may be afforded by punch out portions of the housing or other access elements, such as punch out holes formed in one or both of side walls 1146 or rear wall 1148.

Rear wall 1148 may be coupled to stiffening rim 1114 by a hinge receiving portion 1156. In one configuration, as shown in FIG. 15, hinge receiving portion 1156 may include a stepped or notched configuration for receiving a hinge securing portion 1158 of a device bracket 1160 that receives electrical device 1123 and a hinge portion 1162 of cover 1104. As shown in FIG. 15, in one embodiment, hinge portion 1162 of cover 1104 may be positioned within hinge receiving portion 1156 of stiffening rim 1114. Subsequently, device bracket 1160 may be positioned onto device mounting chamber 1122 such that hinge securing portion 1158 overlays hinge portion 1162. Screws through flanges 1152 and 1153 secure device bracket 1160 to device mounting chamber 1122, thereby securing hinge portion 1162 to housing 1102.

In one implementation, rearward portion 1140 of bottom 1134 (e.g., proximate to device mounting chamber 1122) may include a device mounting slot 1164 formed therethrough, as shown in FIG. 12. During assembly, a mounting tab 1166 in device bracket 1160 may be inserted into device mounting slot 1164 to secure a bottom portion of device 1123 within device mounting chamber 1122.

In some embodiments consistent with implementations described herein, housing 1102 may be formed form as a unitary or integrated element. For example, the components of housing 1102 described above may be integrally molded from a single material, e.g., plastic, at the time of manufacture. In other embodiments, individual components may be individually formed and coupled together by known techniques, e.g., adhesives, welds, fasteners, etc.

Turning now to cover 1104, as shown in FIGS. 11 and 13, cover 1104 includes an upper surface 1168, fluid directing projections 1170, cable configuration element 1172, latch 1174, and cable egress openings 1176. As shown in FIG. 11, upper surface 1168 of cover 1104 is configured to cover the entirety of central opening 1112 when in the closed configuration. For example, outer edges of upper surface 1168 of cover 1104 may be configured to be received within recessed portions 1116 of flange portion 1110 of housing 1102.

Consistent with embodiments described herein, fluid directing projections 1170 may project inwardly from a lower surface of cover 1104. As shown in FIG. 13, fluid directing projections 1170 may be configured to align with gap 1124 between cable receiving chamber 1120 and stiffening rim 1114 and may project vertically below an upper end of cable receiving chamber 1120. Consequently, when water manages to flow between cover 1104 and recessed portions 1116, fluid directing projections 1170 direct the water downwardly into gap 1124 and away from electrical box 1100. Advantageously, such a configuration eliminates the use of gaskets or other sealing members that prevent fluid from entering box 1100. Rather, any fluid that flows under cover 1104 is directed harmlessly away from cable receiving chamber 1120.

Cable configuration element 1172 facilitates the dripping, collection, and flow of water out of cable receiving chamber 1120 due, at least in part, to water migration along cable 1500. As shown in FIG. 16, cable configuration element 1172 may aid in creating a loop 1502 in cable 1500 and to further retain the cable in the loop configuration when cover 1104 is closed. As illustrated in FIG. 13, cable configuration element 1172 may be attached to, and in some implementations be integral with, cover 1104 and extend into cable receiving chamber 1120 when cover 1104 is in the closed configuration. For example, cable configuration element 1172 may project from cover 1104 and extend into cable receiving chamber 1120 a distance that is sufficient to move a portion of cable 1500 downward relative to an inside surface of cover 1104 to form or retain loop 1502 in cable 1500. Loop 1502 may be retained in the preferred shape and configuration illustrated in FIGS. 15 and 16 by cable configuration element 1172 upon closing cover 1104. By facilitating and maintaining loop 1502 in cable 1500, fluid that is traveling along cable 1500 may drip off of cable 1500 at loop 1502 and through openings 1144 and away from electrical box 1100.

As shown in FIGS. 13 and 15, latch 1174 includes a resilient downwardly projecting portion 1178 having a barb 1180 formed thereon. As shown in FIG. 16, upon closing of cover 1104, barb 1180 may engage a portion of stiffening rim 1114 to secure cover 1104 in the closed configuration. As described briefly above, downwardly projecting portion 1178 may be received within latch receiving recess in front wall 1128.

Latch 1174 further includes a thumb recess 1182. When it is desired to open cover 1104, a user may place his/her thumb in thumb recess 1182 and a finger on resilient downwardly projecting portion 1178 and squeeze. This squeezing action causes barb 1180 on resilient downwardly projecting portion 1178 to deflect away from stiffening rim 1114, allowing cover 1104 to be rotated or moved in an upward direction away from central opening 1112 and permitting access to cable receiving chamber 1120 and device mounting chamber 1122.

As shown in FIG. 11, cable egress openings 1176 may be formed adjacent to resilient downwardly projecting portion 1178 in cover 1104 and may provide egress from cable receiving chamber 1120 for allowing one or more cables 1500 connected to electrical device 1123 to exit electrical box 1100. Because cable egress openings 1176 are provided on the front side of cable configuration element 1172, any fluid that enters cover via cable egress openings 1176 impinges on cable configuration element 1172 and is therefor directed to openings 1144. Although two cable egress openings 1176 are shown in FIGS. 11, 13, and 14A, in other configurations, only a single opening 1176 may be provided, or more than two openings 1176 may be provided.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

In addition, while a series of steps have been described with regard to exemplary processes illustrated in FIGS. 9 and 10, the order of the steps may be modified in other implementations. In addition, non-dependent steps may represent features that can be performed at other points in the process, such as in parallel to other steps.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. An electrical box, comprising:
   a housing having a mounting plate and a housing body; and
   a cover rotatably mounted to the housing to cover a central opening in the mounting plate when the cover is in a closed configuration and to allow access to the central opening when the cover is in an open configuration,
   wherein the housing body includes at least one chamber for receiving an electrical device mounted therein and for receiving a cable for connecting to the electrical device,
   wherein the housing body is coupled to the mounting plate by a plurality of rib members to form an open gap between the housing body and the mounting plate, and
   wherein the cover includes fluid directing elements that project downwardly from the cover and which are received within the gap between the housing body and the mounting plate to allow water to flow off of the cover and through the gap and away from the housing body when the cover is in the closed configuration.

2. The electrical box of claim 1, wherein the plurality of rib members are coupled to the mounting plate vertically below a top of the housing body, such that the fluid directing elements in the cover project below the top of the housing body.

3. The electrical box of claim 1, wherein the cover further comprises a cable configuration element projecting therefrom,
   wherein the cable configuration element projects into the at least one chamber when the cover is in the closed configuration to retain the cable connected to the electrical device in a loop configuration.

4. The electrical box of claim 3, wherein the at least one chamber comprises a bottom having a sloped surface to direct fluid flowing within the at least on chamber away from the electrical device.

5. The electrical box of claim 4, wherein the bottom of the at least one chamber includes at least one opening for allowing the fluid to flow out of the at least one chamber.

6. The electrical box of claim 5, wherein the at least one opening is positioned proximate to a loop formed in the cable and retained by the cable configuration element.

7. The electrical box of claim 4, wherein the at least one chamber includes a splash guard element projecting upwardly from the bottom.

8. The electrical box of claim 1, wherein the mounting plate includes a flange portion and a stiffening rim projecting from the flange portion to form the central opening.

9. The electrical box of claim 8, wherein the housing body is coupled to the stiffening rim via the plurality of rib members.

10. The electrical box of claim 8, wherein the flange portion comprises an angled configuration for directing fluid away from the central opening.

11. The electrical box of claim 8, wherein the flange portion comprises a recessed portion for receiving the cover when the cover is in the closed configuration.

12. The electrical box of claim 1, wherein the cover further comprises at least one cable egress opening for permitting the cable connected to the electrical device to egress the at least one chamber.

13. The electrical box of claim 1, wherein the cover comprises a latch assembly for engaging a portion of the mounting plate to secure the cover to the mounting plate in the closed configuration.

14. The electrical box of claim 1, wherein the at least one chamber comprises a cable receiving chamber and a device mounting chamber, wherein the device mounting chamber is environmentally isolated from the cable receiving chamber, wherein the electrical device is mounted in the device mounting chamber.

15. A weatherproof electrical box, comprising:
   a housing body comprising a first chamber and a second chamber, wherein the first chamber includes a front wall, side walls, a back wall, and a bottom, and wherein the second chamber is configured to receive a device mounted therein;
   a mounting plate that includes a flange portion surrounding a central opening,
   wherein the housing body is coupled to the mounting plate in a spaced manner by a plurality of rib members, such that an open gap is formed between the side walls of the first chamber and the mounting plate; and
   a cover coupled to the mounting plate to enclose the central opening and the first chamber when in a closed position, wherein the cover comprises a top surface and a fluid directing portion that projects downwardly from the top surface, wherein at least a portion of the top surface of the cover extends outwardly beyond the fluid directing portion, wherein the fluid directing portion is configured to align with the gap between the sidewalls of the first chamber and the mounting plate when the cover is in the closed position.

16. The weatherproof electrical box of claim 15, wherein the bottom of the first chamber comprises an inclined bottom surface having at least one opening therein, wherein the inclined bottom surface is inclined in a direction toward the device to direct water flow away from the device and toward the at least one opening.

17. The weatherproof electrical box of claim 15, wherein the cover further comprises a cable configuration element extending from a bottom of the cover and into the first chamber when the cover is in the closed configuration, wherein the cable configuration element is configured to retain a cable connected with the device mounted in the second chamber in a looped configuration.

18. An electrical box comprising:

a mounting plate that defines a central opening therethrough, a housing body coupled to the mounting plate and aligned within the central opening, wherein the housing body is coupled to the mounting plate in a spaced configuration by a plurality of rib members, such that an open gap is formed between the mounting plate and the housing body; and a cover hingedly coupled to the mounting plate, such that the cover encloses the central opening when in a closed position, wherein the cover comprises a fluid directing portion and a cable configuration element that project downwardly from the cover, wherein the fluid directing portion is configured to align with the gap between the housing body and the mounting plate when the cover is in the closed position, and wherein the cable configuration element is configured to retain a cable connected to the device mounted in the second chamber in a looped configuration.

19. The electrical box of claim 18, wherein the cover comprise at least one cable egress opening for permitting a cable coupled to a device mounted in the housing body to egress the electrical box when the cover is in the closed position.

20. The electrical box of claim 18, wherein the housing body comprises an inclined bottom have at least one opening therein, wherein the inclined bottom is configured to direct fluid away from a device mounted in the housing body and toward the at least one opening.

* * * * *